(12) United States Patent
Lim et al.

(10) Patent No.: US 12,132,533 B2
(45) Date of Patent: Oct. 29, 2024

(54) DECODING DEVICE AND METHOD IN WIRELESS COMMUNICATION SYSTEM

(71) Applicant: Samsung Electronics Co., Ltd., Suwon-si (KR)

(72) Inventors: Hyuntack Lim, Suwon-si (KR); Hayoung Yang, Suwon-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/173,379

(22) Filed: Feb. 23, 2023

(65) Prior Publication Data
US 2023/0318665 A1 Oct. 5, 2023

Related U.S. Application Data

(63) Continuation of application No. PCT/KR2023/002361, filed on Feb. 17, 2023.

(30) Foreign Application Priority Data

Mar. 4, 2022 (KR) .................. 10-2022-0028358
Apr. 7, 2022 (KR) .................. 10-2022-0043525

(51) Int. Cl.
H04B 7/0417 (2017.01)
H04B 7/06 (2006.01)

(52) U.S. Cl.
CPC .......... *H04B 7/0417* (2013.01); *H04B 7/061* (2013.01)

(58) Field of Classification Search
CPC .......... H04B 7/02; H04B 7/04; H04B 7/0413; H04B 7/0417; H04B 7/061; H04B 7/0608;
(Continued)

(56) References Cited

U.S. PATENT DOCUMENTS 6,757,337 B2 * 6/2004 Zhuang ............. H04L 25/03331
375/240
6,813,219 B1 * 11/2004 Blackmon ............ H04B 11/00
367/134
(Continued)

FOREIGN PATENT DOCUMENTS

KR 10-0923915 B1 10/2009
KR 10-0949987 B1 3/2010
(Continued)

OTHER PUBLICATIONS

International Search Report dated May 1, 2023, issued in International Application No. PCT/KR2023/002361.

*Primary Examiner* — James M Perez
(74) *Attorney, Agent, or Firm* — Jefferson IP Law, LLP

(57) ABSTRACT

An iterative detection and decoding (IDD) device in a receiving device of a wireless communication system by using multiple-input multiple-output (MIMO) and a channel code by connecting is provided. The IDD device includes an MIMO detector that generates an output log likelihood ratio (LLR) value by using signals received from a plurality of antennas and a feedback LLR value, a channel decoder for outputting a channel decoded LLR value through channel decoding and a second operation by using the LLR value of the MIMO detector, and a feedback compensator for generating the feedback LLR value so that the channel decoded LLR value is within the range of an upper threshold and a lower threshold determined based on a bit width of an LLR used by the receiving device.

17 Claims, 9 Drawing Sheets

(58) Field of Classification Search
CPC ... H04L 1/0618; H04L 1/0631; H04L 1/0637; H04L 1/065; H04L 25/03171; H04L 25/03006; H04L 25/03; H04L 25/03318; H04L 25/03312; H03M 13/37; H03M 13/39; H03M 13/3905; H03M 13/3927; H03M 13/3933; H03M 13/1105; H03M 13/1111; H03M 13/1125

See application file for complete search history.

(56) References Cited

U.S. PATENT DOCUMENTS

| | | | | |
|---|---|---|---|---|
| 6,819,630 | B1* | 11/2004 | Blackmon | H04B 11/00 367/134 |
| 6,885,711 | B2* | 4/2005 | Shiu | H03M 13/6337 714/755 |
| 7,154,936 | B2* | 12/2006 | Bjerke | H04L 1/0059 375/150 |
| 7,243,287 | B2* | 7/2007 | Cameron | H03M 13/255 714/752 |
| 7,317,770 | B2* | 1/2008 | Wang | H04L 1/005 375/267 |
| 7,424,063 | B2* | 9/2008 | Yee | H03M 13/00 375/267 |
| 7,464,317 | B2* | 12/2008 | Cameron | H03M 13/1125 714/755 |
| 7,848,440 | B2* | 12/2010 | Farhang Boroujeny | H04L 25/067 370/252 |
| 7,966,545 | B2* | 6/2011 | Cho | H04L 1/0656 714/755 |
| 7,984,367 | B1* | 7/2011 | Chaichanavong | H03M 13/3723 714/788 |
| 8,027,401 | B2* | 9/2011 | Hwang | H04L 1/005 375/267 |
| 8,209,579 | B2* | 6/2012 | Belogolovy | H03M 13/658 714/752 |
| 8,238,488 | B1* | 8/2012 | Lee | H04L 25/03331 375/262 |
| 8,255,766 | B2* | 8/2012 | Hwang | H04B 7/0851 714/791 |
| 8,325,855 | B2* | 12/2012 | Nam | H03M 13/6325 714/788 |
| 8,411,806 | B1* | 4/2013 | Lee | H04L 25/03891 375/349 |
| 8,542,724 | B1* | 9/2013 | Blackmon | H04B 11/00 375/229 |
| 8,549,387 | B2* | 10/2013 | Lee | H03M 13/3723 714/752 |
| 8,559,543 | B1* | 10/2013 | Lee | H04B 7/0413 375/267 |
| 8,601,352 | B1* | 12/2013 | Anholt | H03M 13/618 714/790 |
| 8,713,414 | B2* | 4/2014 | Kamuf | H03M 13/6577 714/780 |
| 8,718,200 | B2 | 5/2014 | Yamagishi | |
| 8,749,408 | B1* | 6/2014 | Li | H03M 7/3082 370/335 |
| 8,774,326 | B2* | 7/2014 | Au Yeung | H04L 25/067 370/464 |
| 9,075,738 | B2* | 7/2015 | Anholt | H03M 13/6393 |
| 9,191,080 | B2* | 11/2015 | Yokomakura | H04B 7/0413 |
| 9,319,083 | B2* | 4/2016 | Yang | H04B 1/16 |
| 9,490,938 | B1* | 11/2016 | Xu | H04L 25/067 |
| 9,660,845 | B2* | 5/2017 | Mitra | H04L 25/03203 |
| 9,768,844 | B2 | 9/2017 | Seifert et al. | |
| 9,831,895 | B2* | 11/2017 | Guillemette | H03M 13/1114 |
| 9,917,723 | B2* | 3/2018 | Yue | H04L 1/005 |
| 9,954,917 | B2* | 4/2018 | Park | H04L 65/762 |
| 10,009,078 | B2* | 6/2018 | Asakura | H04L 5/023 |
| 10,103,843 | B1* | 10/2018 | Liu | H03M 13/2782 |
| 10,153,864 | B2* | 12/2018 | Mohamad | H04L 25/03331 |
| 10,182,439 | B2* | 1/2019 | Choi | H04W 72/0453 |
| 10,270,625 | B2* | 4/2019 | Yue | H04L 1/0048 |
| 10,348,522 | B2* | 7/2019 | Kim | H04L 27/233 |
| 10,511,327 | B2* | 12/2019 | Lee | H03M 13/2948 |
| 10,819,468 | B2* | 10/2020 | Rezazadehreyhani | H04L 1/0054 |
| 10,903,884 | B2* | 1/2021 | Shim | H04B 7/0626 |
| 11,012,170 | B2* | 5/2021 | Lee | H04B 7/0857 |
| 11,108,410 | B1* | 8/2021 | Walke | H03M 13/116 |
| 11,223,447 | B1* | 1/2022 | Erden | H04L 1/0059 |
| 11,522,564 | B2* | 12/2022 | Agrawal | H03M 13/616 |
| 11,558,147 | B2* | 1/2023 | Guzelgoz | H04L 1/0051 |
| 11,799,700 | B1* | 10/2023 | Yang | H04L 25/067 |
| 2003/0007577 | A1* | 1/2003 | Shiu | H03M 13/2957 714/794 |
| 2004/0047438 | A1* | 3/2004 | Zhuang | H04L 1/005 375/340 |
| 2004/0174939 | A1* | 9/2004 | Wang | H04L 1/0055 375/346 |
| 2005/0094742 | A1* | 5/2005 | Yee | H04L 1/005 375/267 |
| 2005/0246606 | A1* | 11/2005 | Cameron | H03M 13/1111 714/752 |
| 2006/0023636 | A1* | 2/2006 | Farhang-Boroujeny | H04L 1/0631 370/252 |
| 2006/0265634 | A1* | 11/2006 | Silvus | H03M 13/2966 714/784 |
| 2007/0067703 | A1* | 3/2007 | Berkmann | H03M 13/2975 714/794 |
| 2007/0230609 | A1* | 10/2007 | Hwang | H04L 1/005 375/267 |
| 2007/0260944 | A1* | 11/2007 | Cameron | H03M 13/255 714/699 |
| 2008/0028277 | A1* | 1/2008 | Cho | H04L 1/0656 714/E11.02 |
| 2008/0168326 | A1* | 7/2008 | Hwang | H04B 7/0413 714/E11.032 |
| 2009/0019332 | A1* | 1/2009 | Hekstra | H03M 13/2975 714/752 |
| 2009/0222711 | A1* | 9/2009 | Belogolovy | H04L 1/005 714/780 |
| 2009/0327836 | A1* | 12/2009 | Shimizu | H03M 13/3905 714/752 |
| 2010/0070819 | A1* | 3/2010 | Stein | H04L 1/0055 714/752 |
| 2010/0077265 | A1* | 3/2010 | Wei | H03M 13/296 714/701 |
| 2011/0311002 | A1* | 12/2011 | Li | H03M 13/6331 375/341 |
| 2012/0117439 | A1* | 5/2012 | Lee | H03M 13/1111 714/752 |
| 2012/0257692 | A1* | 10/2012 | Yeung | H04L 25/061 375/320 |
| 2013/0198591 | A1* | 8/2013 | Kamuf | H03M 13/6577 714/780 |
| 2014/0149820 | A1* | 5/2014 | Anholt | H03M 13/1105 714/758 |
| 2014/0204841 | A1* | 7/2014 | Ruiz Delgado | H04B 7/0452 370/328 |
| 2016/0065275 | A1* | 3/2016 | Reuven | H04L 1/005 375/267 |
| 2016/0072535 | A1* | 3/2016 | Yang | H04L 25/03318 375/341 |
| 2016/0173130 | A1* | 6/2016 | Krysl | H03M 13/611 714/776 |
| 2016/0211867 | A1* | 7/2016 | Guillemette | H03M 13/1114 |
| 2017/0195912 | A1* | 7/2017 | Tujkovic | H04B 7/026 |
| 2017/0238317 | A1* | 8/2017 | Choi | H04L 25/0256 375/341 |
| 2017/0264478 | A1* | 9/2017 | Yue | H04L 27/366 |
| 2018/0123615 | A1* | 5/2018 | Varatkar | H03M 13/116 |
| 2018/0123834 | A1* | 5/2018 | Kim | H04L 27/2278 |
| 2018/0176041 | A1* | 6/2018 | Yue | H04L 25/067 |
| 2020/0067635 | A1* | 2/2020 | Tong | H04L 25/03318 |

(56) References Cited

U.S. PATENT DOCUMENTS

| | | | |
|---|---|---|---|
| 2020/0186277 A1* | 6/2020 | Rezazadehreyhani | H04B 7/0413 |
| 2020/0212979 A1* | 7/2020 | Shim | H04L 5/0048 |
| 2021/0058172 A1* | 2/2021 | Lee | H04B 7/0615 |
| 2021/0142158 A1* | 5/2021 | Agrawal | H03M 13/1111 |
| 2021/0250121 A1* | 8/2021 | Guzelgoz | H04L 1/0051 |
| 2023/0120502 A1* | 4/2023 | Guzelgoz | H04L 1/0054 375/341 |
| 2023/0253984 A1* | 8/2023 | Jang | H03M 13/1111 714/752 |
| 2023/0261912 A1* | 8/2023 | Maunder | H04L 25/03318 375/324 |
| 2023/0318665 A1* | 10/2023 | Lim | H04B 7/0417 375/262 |
| 2023/0344685 A1* | 10/2023 | Maunder | H04L 27/22 |
| 2024/0056133 A1* | 2/2024 | Yang | H03M 13/1102 |

FOREIGN PATENT DOCUMENTS

| | | |
|---|---|---|
| KR | 10-1244303 B1 | 3/2013 |
| KR | 10-1559344 B1 | 10/2015 |
| KR | 10-2016-0029381 A | 3/2016 |
| KR | 10-1832901 B1 | 2/2018 |
| KR | 10-2021-0102116 A | 8/2021 |
| WO | 2014/053838 A1 | 4/2014 |

* cited by examiner

DECODING DEVICE AND METHOD IN WIRELESS COMMUNICATION SYSTEM

CROSS-REFERENCE TO RELATED APPLICATION(S)

This application is a continuation application, claiming priority under § 365(c), of an International Application No. PCT/KR2023/002361, filed on Feb. 17, 2023, which is based on and claims the benefit of a Korean patent application number 10-2022-0028358, filed on Mar. 4, 2022, in the Korean Intellectual Property Office, and of a Korean patent application number 10-2022-0043525, filed on Apr. 7, 2022, in the Korean Intellectual Property Office, the disclosure of each of which is incorporated by reference herein in its entirety.

TECHNICAL FIELD

The disclosure relates to a decoding device and method for correcting errors in data transmitted in a wireless communication system. More particularly, the disclosure relates to a device and method for channel decoding in a wireless communication system using multiple-input multiple-output (MIMO) system and channel coding code by connecting.

BACKGROUND ART

In general, in a wireless communication system, a data error may occur in a receiver due to noise existing in a communication channel. As such, a coding method designed to correct errors, generated by a communication channel, in a receiver is called error correcting codes (ECC). In addition, coding for correcting errors occurring on a communication path between a transmitter and a receiver that is a communication channel, is also called channel coding.

In the error correcting codes technique, a data bit to be transmitted is transmitted by adding an additional bit, and the receiver utilizes the additional bit to perform a decoding operation of correcting an error included in the transmitted the data bit. Such error correcting codes include convolutional coding, turbo coding, low-density parity-check coding (LDPC coding), and polar coding methods, and especially turbo coding and LDPC coding are excellent coding having performance close to the theoretical channel capacity, and have been adopted as core technologies in wireless communication standards such as long term evolution (LTE) and 5th generation (5G).

Meanwhile, multiple-input multiple-output (MIMO) is a technology that increases the capacity of a wireless communication system in proportion to the number of antennas without increasing bandwidth and power by using a plurality of antennas between a transmitting device and a receiving device. Accordingly, MIMO is adopted as a core technology in wireless communication systems such as LTE and 5G, and has been developed into beamforming, massive MIMO, and full dimensional MIMO (FD-MIMO).

In addition, wireless communication systems continue to develop, and MIMO is being discussed as a core technology in 6th generation (6G) wireless communication method that requires higher data transmission rate than long term evolution (LTE) or 5G ($5^{th}$ generation).

The receiver that receives a signal transmitted according to the above-described channel coding method goes through a procedure of detecting an error by decoding the received signal. The turbo coding used in LTE and the LDPC coding used in 5G configure a transmission bit by adding a parity bit, which is an additional bit, to an information bit. In case that the MIMO method is used between the transmitter and the receiver, the MIMO detector calculates a channel log likelihood ratio (LLR) for the transmission bits and provides it to the channel decoder. The channel decoder performs channel decoding using the input channel LLR.

Among these channel decoding techniques, an iterative detection and decoding (IDD) technique is widely used as a representative channel decoding technique. In case that the IDD technique is used, the channel decoder provides the decoded information to the MIMO detector, and then performs decoding using the information provided by the MIMO detector.

Since the information provided between the channel decoder and the MIMO detector is LLR, it may be highly large data. Therefore, in actual implementation, due to an increase in complexity, processing speed, and limitation of memory capacity, it is implemented in a fixed-point method. Therefore, in the fixed-point method, a range constraint occurs depending on the amount of quantization of information. In case that the quantization level is increased, the loss of performance is decreased, but the complexity is increased. Conversely, in case that the quantization level is lowered, the complexity is decreased but the loss of performance is increased. In other words, there is a trade-off relationship between them. Therefore, it may be an especially important factor to determine an optimal quantization level in a fixed-point of a certain size or more according to the quantization level.

Meanwhile, errors or distortion of information inevitably occur as information is quantized. In particular, in case that a value is out of the quantization range, it is expressed by saturation with the maximum size set by the fixed-point method. This consequently causes a problem of degrading the performance of the channel decoder.

The above information is presented as background information only to assist with an understanding of the disclosure. No determination has been made, and no assertion is made, as to whether any of the above might be applicable as prior art with regard to the disclosure.

DISCLOSURE

Technical Problem

The present disclosure provides a channel decoder device and method for preventing decoding performance degradation in a wireless communication system.

In addition, the present disclosure provides a channel decoder device and method capable of maintaining higher decoding performance without increasing the complexity of the channel decoder in a wireless communication system.

In addition, the present disclosure provides a device and method for increasing the soft-output performance of the channel decoder when a receiver using successive interference cancelling (SIC) is used in a communication system using the multiple-input multiple-output (MIMO) method.

In addition, the present disclosure provides a channel decoding device and method for reducing complexity when a receiver using successive interference cancelling (SIC) is used in a communication system using the MIMO method.

Additional aspects will be set forth in part in the description which follows and, in part, will be apparent from the description, or may be learned by practice of the presented embodiments.

Technical Solution

According to an embodiment of the present disclosure, an electronic device in a wireless communication system is provided. The electronic device comprises a multiple-input multiple-output (MIMO) detector configured to generate an output log likelihood ratio (LLR) value based on signals received from a plurality of antennas and a feedback LLR value. The electronic device comprises a channel decoder configured to output a channel decoded LLR value through channel decoding and a second operation by using the LLR value of the MIMO detector. The electronic device comprises a feedback compensator configured to generate the feedback LLR value so that the channel decoded LLR value is between an upper threshold and a lower threshold determined based on a bit width of an LLR of the electronic device.

According to an embodiment of the present disclosure, an electronic device in a wireless communication system is provided. The electronic device comprises a multiple-input multiple-output (MIMO) detector that generates an output log likelihood ratio (LLR) value by using signals received from a plurality of antennas and a feedback LLR value. The electronic device comprises a channel decoder. The channel decoder comprises a channel decoder core configured to perform channel decoding based on the output LLR value and to output a second LLR value. The channel decoder comprises an initial extrinsic LLR calculator configured to generate a decoded LLR value by performing a second operation on the second LLR value. The channel decoder comprises an extrinsic LLR range calculator configured to determine an upper threshold and a lower threshold based on a threshold determined based on a bit width of the LLR of the electronic device. The channel decoder comprises an extrinsic LLR generator configured to generate the feedback LLR value so that the decoded LLR value is between the upper threshold and the lower threshold received from the extrinsic LLR range calculator.

According to an embodiment of the present disclosure, a method performed by an electronic device in a wireless communication system is provided. The method comprises generating an output log likelihood ratio (LLR) value based on signals received from a plurality of antennas and a feedback LLR value. The method comprises outputting a second LLR value by performing channel decoding based on the output LLR value. The method comprises generating a decoded LLR value by performing a second operation on the second LLR value. The method comprises determining an upper threshold and a lower threshold based on a threshold determined based on a bit width of the LLR of the electronic device. The method comprises generating the feedback LLR value so that the decoded LLR value is between the upper threshold and the lower threshold.

According to an embodiment of the present disclosure, an iterative detection and decoding (IDD) device in a receiving device of a wireless communication system by using multiple-input multiple-output (MIMO) and a channel code by connecting is provided. The IDD device includes a MIMO detector that generates an output log likelihood ratio (LLR) value by using signals received from a plurality of antennas and a feedback LLR value, a channel decoder for outputting a channel decoded LLR value through channel decoding and a second operation by using the LLR value of the MIMO detector, and a feedback compensator for generating the feedback LLR value so that the channel decoded LLR value is within the range of an upper threshold and a lower threshold determined based on a bit width of an LLR used by the receiving device.

According to an embodiment of the present disclosure, an iterative detection and decoding (IDD) device in a receiving device of a wireless communication system by using multiple-input multiple-output (MIMO) and a channel code by connecting is provided. The IDD device includes a MIMO detector that generates an output log likelihood ratio (LLR) value by using signals received from a plurality of antennas and a feedback LLR value, and a channel decoder.

The channel decoder includes a channel decoder core that performs channel decoding by using the output LLR value and outputs a second LLR value, an initial extrinsic LLR calculator for generating the decoded LLR value by performing the second operation on the second LLR value, an extrinsic LLR range calculator for determining the upper threshold and the lower threshold by using a threshold determined based on the bit width of the LLR used by the receiving device, and an extrinsic LLR generator for generating the feedback LLR value so that the decoded LLR value is within the range of the upper and lower thresholds received from the extrinsic LLR range calculator.

A method according to an embodiment of the present disclosure, an iterative detection and decoding (IDD) method in a receiving device of a wireless communication system by using multiple-input multiple-output (MIMO) and a channel code by connecting is provided. The IDD method includes generating an output log likelihood ratio (LLR) value by using signals received from a plurality of antennas and a feedback LLR value, outputting a second LLR value by performing channel decoding by using the output LLR value, generating the decoded LLR value by performing a second operation on the second LLR value, determining the upper threshold and the lower threshold by using a threshold determined based on a bit width of the LLR used by the receiving device, and generating the feedback LLR value so that the decoded LLR value is within the range of the upper threshold and the lower threshold.

Advantageous Effects

In case that the decoding device according to the disclosure is used, it can be possible to generate soft-output capable of improving the performance of the sequential interference receiver of the coded MIMO system without significantly increasing the complexity of the channel decoder. In addition, since the method presented in the disclosure can be configured and applied independently of the existing channel decoder, the performance of the existing receiver can be improved without redesigning and implementing the channel decoder having a complicated implementation.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
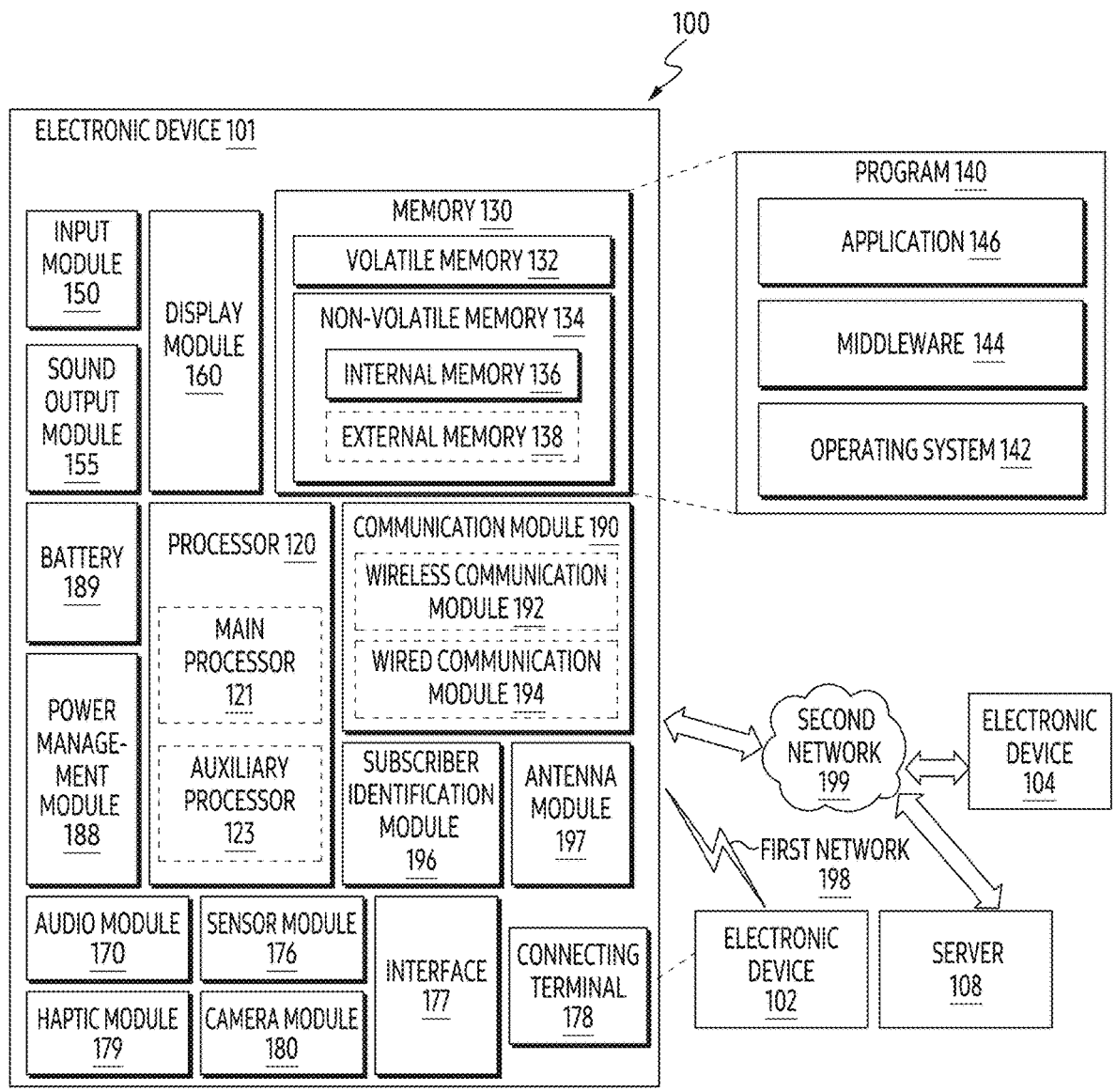
FIG. 1 is a block diagram of an electronic device 101 in a network environment 100 according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or user plane (U-plane) latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the millimeter wave (mmWave) band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
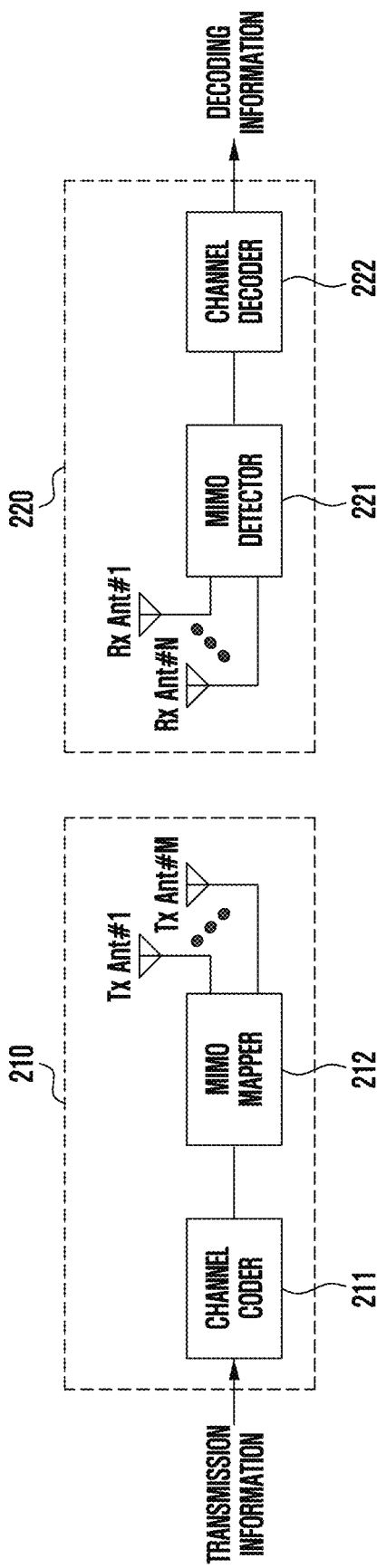
FIG. 2 is a drawing illustrating a simplified configuration of a transmitter and a receiver of a multiple-input multiple-output (MIMO) system according to an embodiment of the disclosure.

FIG. 2 is a drawing illustrating a simplified configuration of a transmitter and a receiver of a multiple-input multiple-output (MIMO) system according to an embodiment of the disclosure. Before describing the decoder according to the disclosure, a configuration of the transmitter and the receiver of the MIMO system will be described with reference to FIG. 2.

Referring to FIG. 2, a transmitter 210 and a receiver 220 are illustrated. In the following description, the transmitter 210 may be described by assuming a base station of a long term evolution (LTE), fifth generation (5G), and/or sixth generation (6G) system among wireless communication systems, and the receiver 220 may become the electronic device 101 described in FIG. 1. In addition, in case that the electronic device 101 described in FIG. 1 becomes the transmitter 210, the base station may become the receiver 220. However, the transmitter and receiver of the disclosure are not limited to transmitters and receivers of LTE, 5G, and/or 6G systems. For example, in the case of using the device-to-device (D2D) method and/or other communication methods, for example, in the case of an access point (AP) and a terminal in a WiFi method, it may be replaced by a transmitter and a receiver in various cases.

The transmitter 210 of FIG. 2 may include a channel coder 211 for coding information to be transmitted, a MIMO mapper 212 for mapping the coded signal to be transmitted to a plurality of transmission (Tx) antennas Tx ant #1 and Tx ant #M, and a plurality of transmission antennas Tx ant #1 and Tx ant #M. Herein, the plurality of transmission antennas Tx ant #1 and Tx ant #M may also be used as reception antennas. However, for convenience of description, it should be noted that it was illustrated as transmission antennas Tx ant #1 and Tx ant #M because it is described from the perspective of the transmitter.

In addition to the configuration illustrated in FIG. 2, the transmitter 210 may further have a configuration such as a band up converter and a power amplifier for transmitting a signal to a transmission band. In addition, in case of being included in the base station, the transmitter 210 may further include various components such as a base station controller and a scheduler. However, it should be noted that in FIG. 2, only the configuration necessary for describing the disclosure is illustrated and described.

The channel coder 211 of the transmitter 210 may code information to be transmitted in a promised manner with the receiver 220. In this case, as the coding method, any one or more methods of the above-described coding methods such as convolutional coding, turbo coding, low-density parity-check coding (LDPC coding), and polar coding method may be used.

The signal coded by the channel coder 211 may be mapped to be transmitted by the MIMO mapper 212 to a plurality of antennas. A mapping method in the MIMO mapper 212 may be mapped in different forms depending on a method required by each system, and in the disclosure, no restrictions are placed on this.

Signals output from the MIMO mapper 212 may be transmitted through a plurality of transmission antennas Tx ant #1 and Tx ant #M. In a system adopting a structure for transmitting a signal by connecting MIMO and a channel code, the MIMO mapper 212 may perform processing to transmit a channel coded signal through a number of transmission antennas Tx ant #1 and Tx ant #M. Since the method of connecting MIMO and the channel code and transmitting them to the physical layer is widely used in LTE and 5G systems, an additional description thereof will be omitted.

In addition, the receiver 220 may include a plurality of receiving (Rx) antennas Rx ant #1 and Rx ant #N, and a MIMO detector 221 and a channel decoder 222 for detecting signals received from the plurality of antennas. Herein, a plurality of reception antennas Rx ant #1 and Rx ant #N may also be used as transmission antennas in case of transmitting a signal as described above in the transmitter 210.

In addition to the configuration illustrated in FIG. 2, the receiver 220 may further have a configuration such as a low noise amplifier and a band down converter. In addition, in case that the receiver 220 is implemented as an electronic device, at least part of the configurations described in FIG. 1 may be included. In the disclosure, since the description will be described from the viewpoint of decoding the received signal, further description of these configurations will be omitted.

The receiver 220 of FIG. 2 may receive a signal transmitted from the transmitter 210 through a plurality of reception antennas Rx ant #1 and Rx ant #N. In this case, the signal received through the plurality of reception antennas Rx ant #1 and Rx ant #N receives a signal transmitted from the transmitter 210 as well as a signal distorted by a channel transmitted from the transmitter 210.

First, the MIMO detector 221 of the receiver 220 may output a signal in a state in which the MIMO and the channel code are connected with respect to a signal received from the plurality of reception antennas Rx ant #1 and Rx ant #N by separating through a reverse process in the MIMO mapper 212 of the MIMO transmitter.

The signal output from the MIMO detector 221 may be input to the channel decoder 222. The channel decoder 222 may obtain transmission information to be transmitted by the actual transmitter 210, by decoding a signal distorted in the transmitted channel. In this case, as described above, the channel decoder 222 may perform decoding based on the promised coding method between the transmitter 210 and the receiver 220, and output a decoded result.

Meanwhile, a technique for efficiently receiving and decoding a signal received in a coded MIMO system in which MIMO and the channel code are connected is required. Then, a method for decoding a received signal in the coded MIMO system in which MIMO and the channel code are connected will be described.

If an optimal reception technique is applied in the coded MIMO system, optimal performance may be obtained. However, there is a problem that the complexity increases exponentially with the number of antennas when the optimal reception technique is applied. In other words, the complexity increases exponentially according to the number of antennas commonly used between the transmitter 210 and the receiver 220. Therefore, the optimal reception technique may be limitedly applicable only in an environment in which the number of antennas is small due to high complexity. This is because, in case of increasing complexity of the receiver, the manufacturing cost increases and the use time of the battery-powered electronic device 101 is shortened.

Therefore, the optimal reception technique is difficult to apply to a case where the number of antennas is large, such as massive MIMO, which is currently widely used. Accordingly, various sub-optimal reception techniques have been proposed. As a representative sub-optimal reception technique, there is a technique using an iterative detection and decoding (IDD) receiver.

Figure 3A:
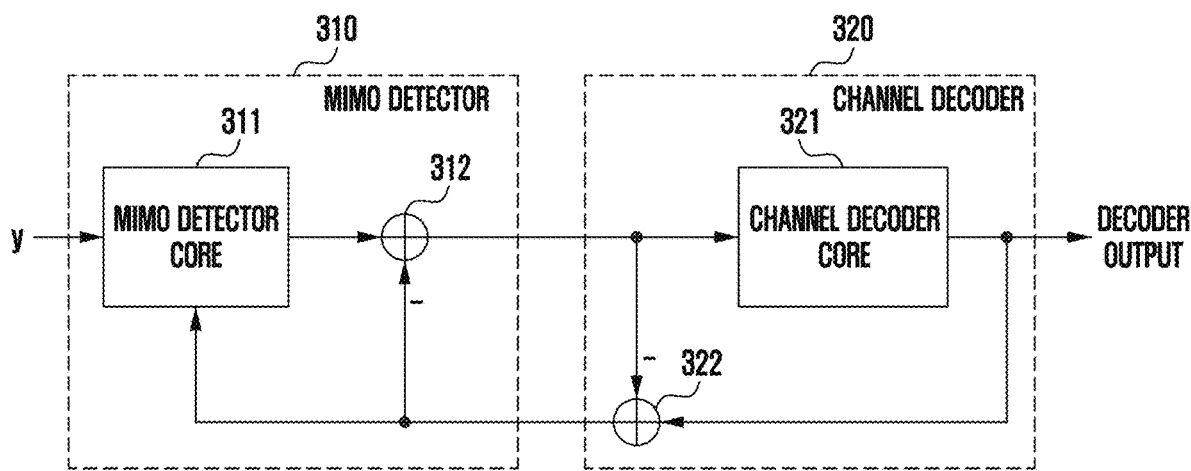
FIG. 3A is a configuration diagram of an iterative detection and decoding (IDD) receiver that is generally widely used in a wireless communication system using MIMO and channel code by connecting according to an embodiment of the disclosure.

FIG. 3A is a configuration diagram of an iterative detection and decoding (IDD) receiver that is generally widely used in a wireless communication system that uses MIMO and a channel code by connecting according to an embodiment of the disclosure.

Referring to FIG. 3A, reference numerals different from reference numerals used in FIG. 2 are used. In other words, the MIMO detector 310 in FIG. 3A may be configured as the MIMO detector 221 described in FIG. 2. In addition, the channel decoder 320 illustrated in FIG. 3A may correspond to the channel decoder 222 described in FIG. 2.

Then, a configuration of the iterative detection and decoding receiver will be described first with reference to FIG. 3A.

The MIMO detector 310 of the iterative detection and decoding receiver may briefly include a MIMO detector core 311 and a first adder 312. In addition, the channel decoder 320 of the iterative detection and decoding receiver may include a channel decoder core 321 and a second adder 322.

Then, an operation of the iterative detection and decoding receiver illustrated in FIG. 3A will be briefly described.

A signal y received from a plurality of reception antennas is input to the MIMO detector core 311. In addition, the signal output from the channel decoder 320 is fed back and input to the MIMO detector core 311. Accordingly, the MIMO detector core 311 detects the received signal using the two signals, and outputs it to the first adder 312. The first adder 312 also receives a signal fed back from the channel decoder 320, calculates the difference between the signal of the MIMO detector core 311 and the signal received from the channel decoder 320, and outputs the calculation result to the channel decoder.

The channel decoder core 321 may decode the signal received from the first adder 312 of the MIMO detector 310 and output a result of the decoding. The channel decoder core 321 may output the result of the decoding and simultaneously input the result of the decoding to the second adder 322. The second adder 322 may also provide the signal received from the MIMO detector 310 as another input. The second adder 322 may calculate the difference between the signal received from the MIMO detector 310 and the result of the decoding in the decoded signal to feed it back to the MIMO detector 310.

Meanwhile, the actual decoded signal is not output until iterative decoding is completed between the MIMO detector 310 and the channel decoder 320. In other words, the decoded signal may be output only in case that decoding is performed for a predefined number of repetitions between the MIMO detector 310 and the channel decoder 320 and/or decoding success occurs.

In general, the iterative detection and decoding receiver has a characteristic in which information exchange is repeatedly performed between the MIMO detector 310 and the channel decoder 320. In addition, the iterative detection and decoding receiver shows performance close to the optimal performance as the number of repetitions of information exchange between the MIMO detector 310 and the channel decoder 320 increases. Besides, as illustrated in FIG. 3A, it has the advantage of having lower complexity than the optimal reception technique, and thus is widely used.

The method described above may be described as follows by looking it in an equation again.

The MIMO detector core 311 illustrated in FIG. 3A may calculate and output a priori Log Likelihood Ratio (LLR) value using the input signal y. The output of the MIMO detector core 311 as the received signal may be defined as shown in Equation 1 below.

$$L^{APP}(c) = \ln\frac{P(c=0|y)}{P(c=1|y)} \quad \text{Equation 1}$$

In Equation 1, c means a coded information bit for which the LLR is calculated, and $L^{APP}$ means a posteriori probability (APP) LLR value. In addition, P (•) means a probability value for •. Equation 1 illustrated above may be arranged as shown in Equation 2 below according to Bayes's theorem.

$$L^{APP}(c) = \ln\frac{P(y|c=0)P(c=0)}{P(y|c=1)P(c=1)} \quad \text{Equation 2}$$

In addition, according to the addition law of the logarithmic function, Equation 2 may be expressed again as Equation 3 below.

$$L^{APP}(c) = \ln\frac{P(y|c=0)}{P(y|c=1)} + \ln\frac{P(c=0)}{P(c=1)} \quad \text{Equation 3}$$

$$= L^{EXT}(c) + L^{PRI}(c)$$

In Equation 3, the first term corresponding to $L^{APP}$(b) is called an extrinsic LLR for c, and the second term means a priori LLR for c. Therefore, as a result, $L^{APP}$(c) may be the result of adding $L^{EXT}$(c) and $L^{PRI}$(c).

The extrinsic LLR generated by the first adder 312 of FIG. 3A may be recognized as a priori LLR from the perspective of the channel decoder 320. Therefore, the channel decoder core 321 may output the priori LLR in the MIMO detector 310 and perform the same calculation as Equation 1 described above.

The output value from the channel decoder core 321 may be input to the second adder 322 as a priori LLR again, and as described above, by using the output of the MIMO detector 310 as the other input, the difference between the outputs of the channel decoder core 321 and the MIMO detector 310 may be calculated and output as the extrinsic LLR. The extrinsic LLR output from the channel decoder 320 may become a priori LLR from the perspective of the MIMO detector 310 again.

As such, if the MIMO detector 310 receives the APP LLR generated by the channel decoder 320 as a priori LLR, the same information is continuously overlapped inside the MIMO detector 310 since the corresponding APP LLR contains the extrinsic LLR generated by the operation of the previous MIMO detector 310.

Accordingly, if there is an error in the generated APP LLR, the MIMO detector 310 and the channel decoder 320 exchange the extrinsic LLR, not the APP LLR, to each other in IDD since the error continues to accumulate as the number of iterations of the IDD increases.

As described above, if the IDD method is followed, in general, accuracy increases as the iteration increases. However, if an error exists, there is a problem that the accumulated error of the above method may also increase. Therefore, the disclosure provides a method, procedure, and device for efficiently generating soft-decision information on a transmission bit by using a posterior probability and a prior probability for the transmission bit generated by a channel decoder using an IDD method.

Prior to describing an embodiment of the disclosure, an operation of a receiver in the wireless communication system will be briefly summarized below.

The turbo coding used for LTE and the LDPC coding used for 5G configure a transmission bit by adding a parity bit to the information bit. The MIMO detector of the receiver calculates the channel LLR for the transmission bits, and inputs the calculation result to the channel decoder. The channel decoder performs channel decoding using the input channel LLR. In this case, the LLR for the information bit becomes prior information on the information bit from the perspective of the channel decoder, and may be referred to as a priori LLR. If channel decoding is completed, a posteriori probability LLR (APP LLR) information for the information bit may be obtained. If the corresponding information bit estimation value is obtained by hard-decision on the APP LLR value, the operation of the receiver is completed.

In addition, as described above with reference to FIG. 3A, IDD is a representative reception technique of the coded MIMO system. IDD has a feature of repeatedly performing information exchange on the transmission bit between the MIMO receiver and the channel decoder. In this case, the channel decoder must generate soft-decision information on the transmission bit to generate information to be transmitted to the MIMO receiver, and this information is calculated by APP LLR and priori LLR.

Since such a channel decoder has an extremely high complexity, it is necessary to implement a fixed-point, which is advantageous in terms of speed and memory usage. In the fixed-point implementation, since all information is quantized, the range of values that may be expressed is limited. Quantization is the main cause of performance degradation compared to floating-point implementation. As the quantization level is relaxed in a fixed-point implementation, the performance loss decreases, but the complexity increases. Therefore, in a fixed-point implementation, the quantization level is determined through a trade-off between performance and complexity.

In an actual implementation, since the range of expression of a value is limited depending on the degree of quantization, a value larger than a certain size is expressed by saturation with the maximum size of the fixed-point. The channel decoder for a turbo coding or an LDPC coding aims to calculate the APP LLR, and the quantization level is generally determined depending on the range of expression of the APP LLR due to a trade-off between performance and complexity. Therefore, in the fixed-point implementation, distortion occurs in the extrinsic LLR. This distortion causes performance differences between the theory and implementation of extrinsic LLR based reception techniques. In order to prevent the performance difference, the quantization level of the APP LLR should be relaxed, but the relaxation of the quantization level increases the complexity of the channel decoder. Therefore, for the fixed-point implementation of the reception technique using the extrinsic LLR, an appropriate post-processing function capable of relaxing the distortion of the extrinsic LLR is important.

Figure 3B:
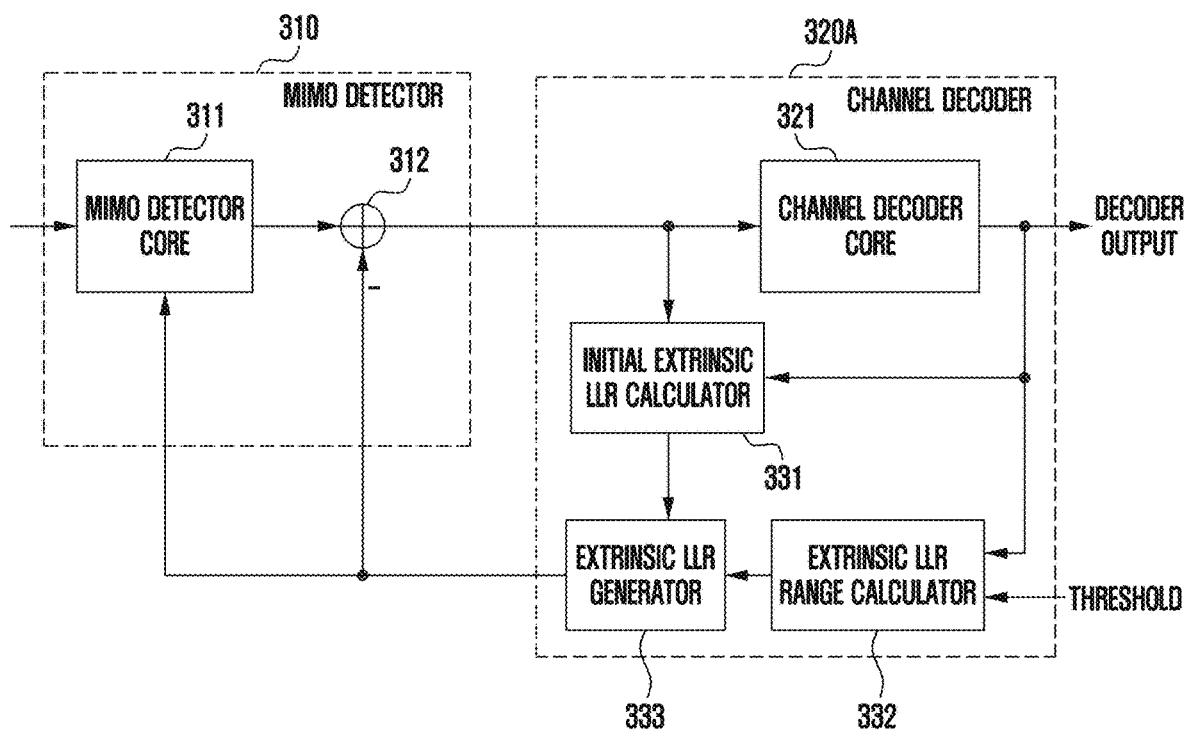
FIG. 3B is a block diagram of an iterative detection and decoding (IDD) receiver in a wireless communication system using MIMO and channel code by connecting according to an embodiment of the disclosure.

FIG. 3B is a block diagram of an iterative detection and decoding (IDD) receiver in a wireless communication system using MIMO and a channel code by connecting according to an embodiment of the disclosure.

In the following description, as described above with reference to FIG. 3A, since the channel decoder performs decoding using the LLR instead of the probability for the transmission bit, from here on, the description will be described as the LLR instead of the probability. In addition, the same reference numeral will be used for the same configuration in FIG. 3A.

The receiver according to the disclosure may include a MIMO detector 310 and a channel decoder 320A as described with reference to FIG. 2. The MIMO detector 310 according to the disclosure may have the same configuration as the MIMO detector 310 described above with reference to FIG. 3A. In the disclosure, it may be in a form in which the configuration of the channel decoder 320A is changed.

The channel decoder 320A according to the disclosure may include a channel decoder core 321, an initial extrinsic LLR calculator 331, an extrinsic LLR range calculator 332, and an extrinsic LLR generator 333.

First, it will be described from the perspective of the overall operations. The receiver 220 illustrated in FIG. 2 above may output a receiving signal y from each of a plurality of reception antennas. The signal y received from each antenna is input to the MIMO detector 221. The MIMO detector 221 illustrated in FIG. 2 may have the same configuration as the MIMO detector 310 of FIG. 3B. In addition, as described above, it is assumed that operations such as low noise amplification, band down conversion, and channel equalization have already been processed in the receiver according to the disclosure, so the description thereof will be omitted.

The MIMO detector 310 may include a MIMO detector core 311 and a first adder 312 as described with reference to FIG. 3A. The MIMO detector core 311 may calculate an APP LLR value using the signal y output from each of the plurality of reception antennas and the signal decoded and fed back by the channel decoder 320A. Since the description for this has been described above with reference to FIG. 3A, an additional description thereof will be omitted.

The APP LLR value calculated by the MIMO detector core 311 is output to the first adder 312. The first adder 312 may use the APP LLR value calculated by the MIMO detector core 311 and the value decoded by the channel decoder 320 as one input, respectively. The first adder 312 may calculate a difference between the APP LLR value calculated by the MIMO detector core 311 and the value decoded by the channel decoder 320, and output the difference to the channel decoder 320. The value output from the MIMO detector 310 becomes an extrinsic (EXT) LLR value as described above.

The channel decoder 320A according to FIG. 3B, which is an embodiment of the disclosure, may include a channel decoder core 321, an initial extrinsic LLR calculator 331, an extrinsic LLR range calculator 332, and an extrinsic LLR generator 333. Since the channel decoder core 321 in FIG. 3B may perform the same operation as the channel decoder core in FIG. 3A, the same reference numeral will be used to describe.

The channel decoder core 321 may consider the EXT LLR value received from the first adder 312 of the MIMO detector 310 as a priori (PRI) LLR. Accordingly, the channel decoder core 321 may calculate the APP LLR using the PRI LLR. The APP LLR value calculated by the channel decoder core 321 may have a different output path according to one of the following two methods. In the disclosure, no restrictions will be placed on the methods below.

First, in the IDD method, in case that the iterative decoding is repeated a predetermined number of times, the output of the channel decoder core 321 may be output to the outside, and in case that the iterative decoding is not repeated a predetermined number of times, the output of the channel decoder core 321 may be feedback. This is because, as described above, the IDD method improves decoding performance as the number of iterations increases.

Second, even if the predetermined number of times is not repeated, a path may be set so that it is always output to the outside and feedback is made at the same time. For early termination of the decoding operation, it may be used in case that determination is performed using the LLR value of the channel decoder core 321.

The APP LLR value decoded by the channel decoder core 321 may be input to the initial extrinsic LLR calculator 331 and the extrinsic LLR range calculator 332 according to the disclosure.

First, the initial extrinsic LLR calculator 331 may receive an output of the MIMO detector 310, that is, an EXT LLR value output from the first adder 312 of the MIMO detector 310 as a PRI LLR value. In addition, the initial extrinsic LLR calculator 331 may receive the APP LLR value calculated by the channel decoder core 321. The initial extrinsic LLR calculator 331 may remove the PRI LLR value input from the first adder 312 of the MIMO detector 310 from the APP LLR value calculated by the channel decoder core 321. For example, the removal operation may use Equation 4 below.

$$L_{EXT,init} = L_{APP} - L_{priori} \qquad \text{Equation 4}$$

In Equation 4, $L_{EXT,init}$ means an LLR value that is an output value of the initial extrinsic LLR calculator 331. In addition, $L_{APP}$ is an LLR value output from the channel decoder core 321, and $L_{prior}$ means an output of the MIMO detector 310, that is, an LLR value output from the first adder 312 of the MIMO detector 310.

As a result, the initial extrinsic LLR calculator 331 may calculate a difference between the APP LLR value calculated by the channel decoder core 321 and the PRI LLR value input from the first adder 312 of the MIMO detector 310. Therefore, the initial extrinsic LLR calculator 331 may be implemented as the second adder 322 described with reference to FIG. 3A. Thus, the value calculated by the initial extrinsic LLR calculator 331 may be input to the extrinsic LLR generator 333.

In addition, the APP LLR value calculated by the channel decoder core 321 may be input to the extrinsic LLR range calculator 332. The extrinsic LLR range calculator 332 may calculate an extrinsic LLR upper boundary and an extrinsic LLR lower boundary to output a result of the calculation above. The extrinsic LLR range calculator 332 may receive a threshold for an extrinsic LLR upper value and an extrinsic LLR lower value to prevent saturation that occurs in the previous fixed-point method. In FIG. 3B, the EXT LLR upper value and the EXT LLR lower value are illustrated in a form input from the outside to clarify that they are used, but the EXT LLR upper value and the EXT LLR lower value may be stored in the extrinsic LLR range calculator 332 on their own.

For example, the extrinsic LLR range calculator 332 may calculate an upper threshold based on Equation 5 below. In addition, for example, the extrinsic LLR range calculator 332 may calculate a lower threshold based on Equation 6 below.

$$TH_{upper} = \min(L_{APP} + TH, M) \qquad \text{Equation 5}$$

$$TH_{lower} = \max(L_{APP} - TH, -M) \qquad \text{Equation 6}$$

In Equations 5 and 6, $TH_{upper}$ is the upper threshold, $TH_{lower}$ is the lower threshold, $L_{APP}$ is an LLR value output from the channel decoder core 321, and TH is a preset value. In addition "M" means the maximum LLR value determined by the bit width for quantizing the LLR in implementing the fixed-point method, and "–M" means the minimum LLR value determined by the bit width for quantizing the LLR in implementing the fixed-point method. As above, an extrinsic (EXT) LLR is generated within a certain range based on a posteriori probability (APP) LLR. In order to reflect this characteristic, the range of the EXT LLR may be limited through a process of adding or subtracting a preset threshold (TH) in APP LLR.

For example, if TH is assumed to be zero (0), $TH_{upper}$ and $TH_{lower}$ become the same value, and EXT LLR becomes the same value as APP LLR regardless of the initial EXT LLR. As a result, the initial EXT LLR within the range of $TH_{upper}$ and $TH_{lower}$ may be considered a normal LLR. That is, $TH_{upper}$ and $TH_{lower}$ may be determined by adding TH in $L_{APP}$ or calculating a value of a difference, for using the initial EXT LLR as it is in the MIMO detector.

Therefore, the extrinsic LLR range calculator 332 may identify whether the value received from the channel decoder core 321 is within the extrinsic LLR range, and may set to a preset threshold in case that the value is not within the extrinsic LLR range, and output the value to the extrinsic LLR generator 333.

The extrinsic LLR generator 333 may generate and output an EXT LLR value to be output to the MIMO detector 310 for iterative decoding by receiving the output from the initial extrinsic LLR calculator 331 and the output from the extrinsic LLR range calculator 332. For example, if the information received from the extrinsic LLR range calculator 332 indicates that the EXT LLR upper value or the EXT LLR lower value is out of the range, the extrinsic LLR generator 333 may output a preset EXT LLR upper value or a preset EXT LLR lower value. On the other hand, if the information received from the extrinsic LLR range calculator 332 indicates that the EXT LLR upper value or the EXT LLR lower value is within the range, the extrinsic LLR generator 333 may output the value received from the initial extrinsic LLR calculator 331 as an EXT LLR value. The operation for the extrinsic LLR generator 333 will be described in more detail in FIG. 5 which is described below.

As such, in case that the value calculated by the channel decoder core 321 exceeds the quantization range, the feedback compensator 330 according to the disclosure causes to output the LLR value preset as the maximum value and the minimum value, thereby errors may be reduced. Accordingly, as the iterative decoding is performed, decoding performance may be improved.

Figure 3C:
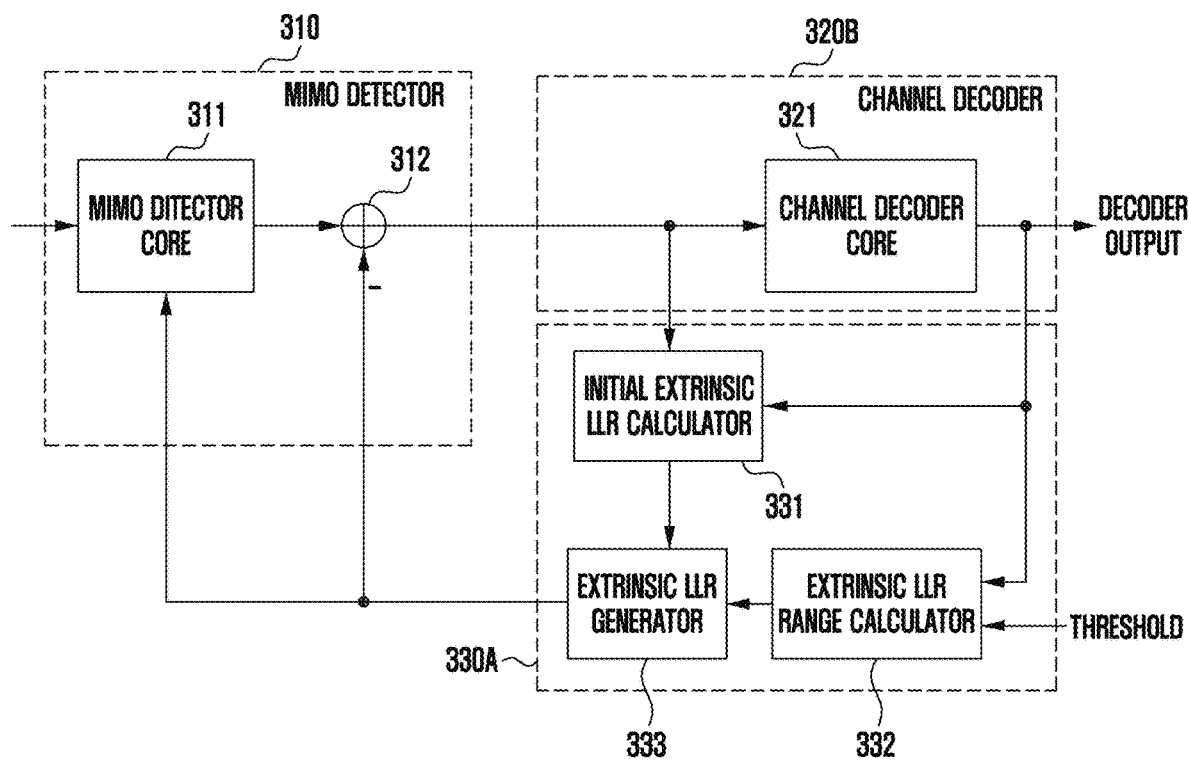
FIG. 3C is a block diagram of an iterative detection and decoding (IDD) receiver in a wireless communication system using MIMO and channel code by connecting according to an embodiment of the disclosure.

FIG. 3C is a block diagram of an iterative detection and decoding (IDD) receiver in a wireless communication system using MIMO and channel code by connecting according to an embodiment of the disclosure.

FIGS. 3B and 3C will be described in comparison. FIG. 3C illustrates a form implemented by the channel decoder 320B and the feedback compensator 330A. The channel decoder 320 may be implemented only with the channel decoder core 321 described with reference to FIGS. 3A and 3B.

In addition, the configuration of the initial extrinsic LLR calculator 331, the extrinsic LLR range calculator 332, and the extrinsic LLR generator 333 described with reference to FIG. 3B may be in a form of configuring the feedback compensator 330A.

Illustrated in FIG. 3C, respective block configuration and a connection relationship between each block are the same as described in FIG. 3B. However, the examples illustrated like different configurations in FIGS. 3B and 3C may be classified according to an implementation method of a module if an actual product is implemented. For example, in a case of implementing a channel decoder as shown in FIG. 3B based on the shape of the channel decoder 320 of FIG. 3A, it may be necessary to redesign the channel decoder itself. In this case, if the channel decoder 320B of FIG. 3C is used, the burden of design may be reduced. Then, as the feedback compensator 330A is added, there is an advantage that the change in the implementation of the receiver is reduced. In addition, even if the method of FIG. 3C is adopted, since the implementation method of FIG. 3C has the same configuration as that of FIG. 3B, the implementation method may generate the same effect as that of FIG. 3B.

Figure 3D:
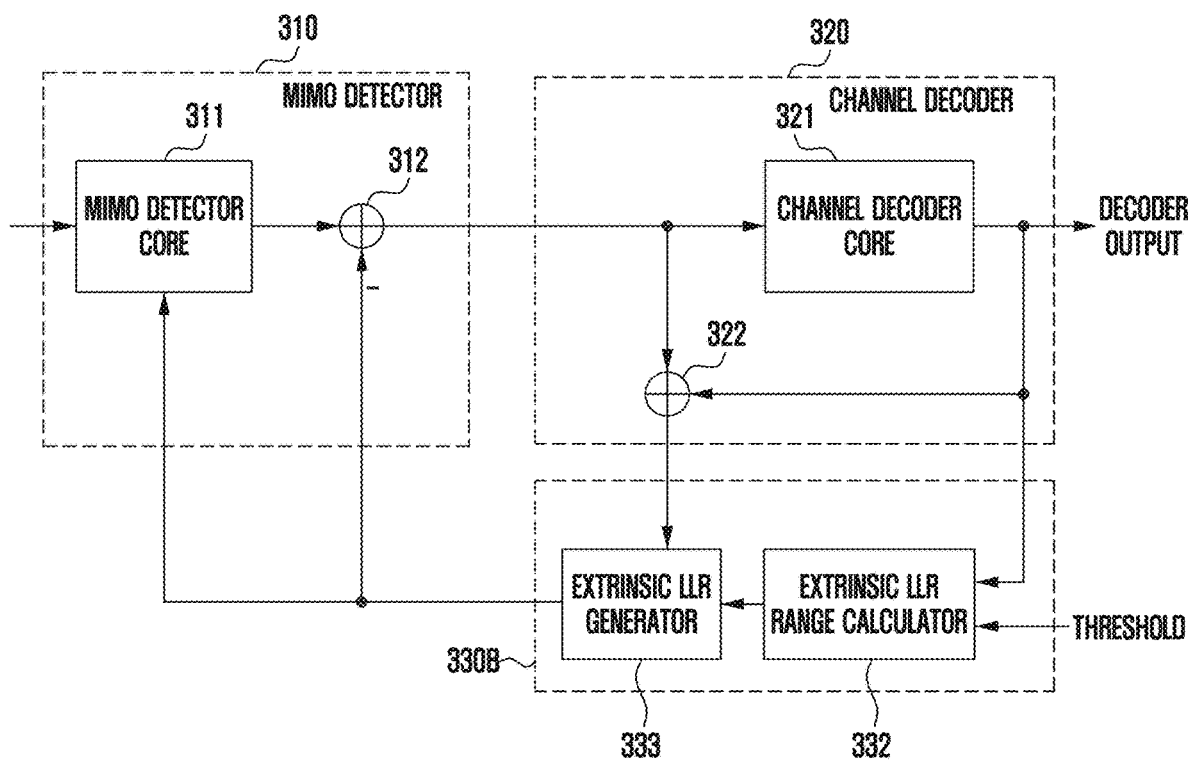
FIG. 3D is a block diagram of an iterative detection and decoding (IDD) receiver in a wireless communication system using MIMO and channel code by connecting according to an embodiment of the disclosure.

FIG. 3D is a block diagram of an iterative detection and decoding (IDD) receiver in a wireless communication system using MIMO and channel code by connecting according to an embodiment of the disclosure.

FIGS. 3B, 3C, and 3D will be described in comparison. FIG. 3D illustrates a form implemented by the channel decoder 320 and the feedback compensator 330B. It should be noted that the channel decoder 320 has the same form as that of FIG. 3A. In the previous description of FIG. 3B, it has been described that the operation of the initial extrinsic LLR calculator 331 may be in a form of performing the same operation as that of the second adder described above. Accordingly, the channel decoder 320 may be used as it is without any other design change.

If the configuration of the channel decoder 320 is not changed, the feedback compensator 330B may be implemented only by the extrinsic LLR range calculator 332 and the extrinsic LLR generator 333. In addition, their connection configuration corresponds to a case which the initial extrinsic LLR calculator 331 is replaced with the second adder 322 when compared to FIG. 3B, so the operation of other configurations may be applied in the method described in FIG. 3B above.

If implemented as shown in FIG. 3D, in contrast to FIG. 3C, there is an advantage that the existing channel decoder itself may be used as it is when implementing an actual product. Accordingly, there is an advantage that a change in the implementation of the receiver is reduced by adding only the feedback compensator 330B newly. In addition, even if the method of FIG. 3D is adopted, since the implementation method of FIG. 3D has the same configuration as that of FIG. 3B, the implementation method may generate the same effect as that of FIG. 3B.

Figure 4:
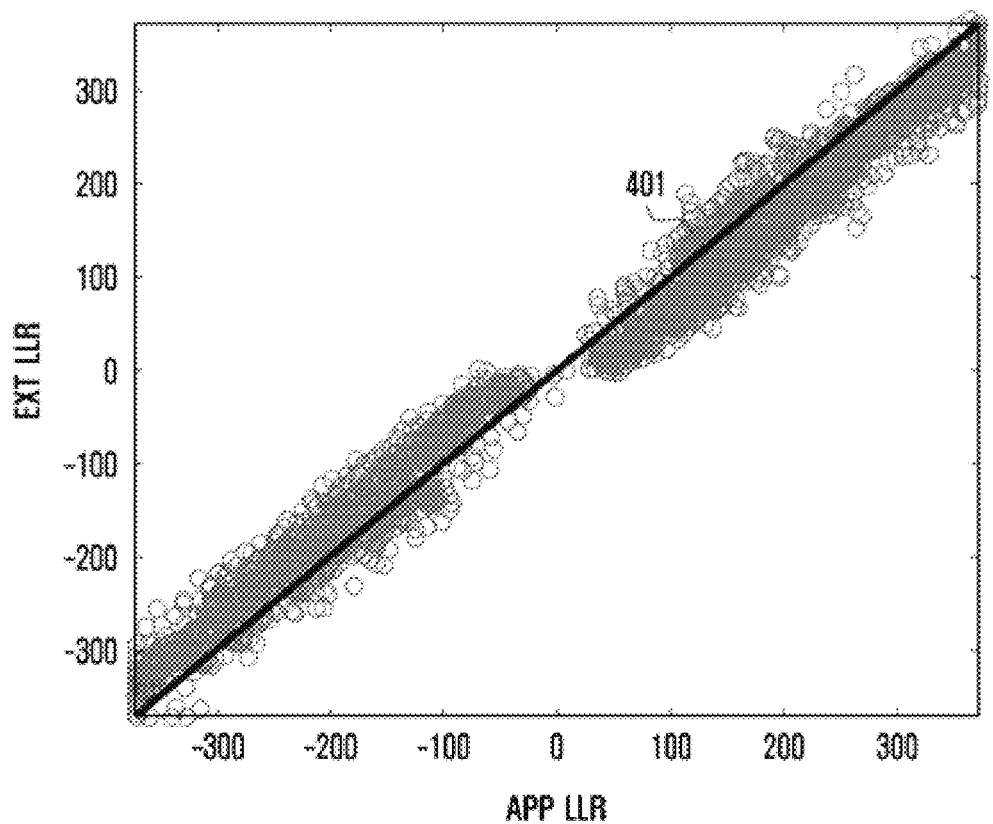
FIG. 4 is a statistical characteristic graph for confirming a correlation between a posteriori probability log likelihood ratio (LLR) value and an extrinsic LLR value in a channel detector according to an embodiment of the disclosure.

FIG. 4 is a statistical characteristic graph for confirming a correlation between a posteriori probability LLR value and an extrinsic LLR value in a channel detector according to an embodiment of the disclosure.

Referring to FIG. 4, the y-axis illustrates the EXT LLR value, and the x-axis illustrates an APP LLR value of the channel detector. It may be confirmed by the trend line of reference numeral 401 illustrated in FIG. 4 that the APP LLR value and the EXT LLR value have a proportional relationship. Therefore, in the disclosure, the extrinsic LLR may be efficiently calculated using statistical characteristic between the extrinsic LLR and the APP LLR.

Referring to the graph of FIG. 4, the x-axis and the y-axis illustrate APP LLR and EXT LLR, respectively, and are graphs between LLR values expressed as 8-bit fixed-point. Since M is assumed to be 8, the maximum value is expressed as 127. If a value is expressed in a floating point method in an implementation of a fixed point method, a fractional part may be expressed by taking an integer part by multiplying the value of a fixed_scaling factor to express a fractional part. Briefly expressing this, it can be calculated as follows.

LLR_fixed=round(LLR_float*fixed_scaling factor)  [Equation 7]

FIG. 4 shows an example in which the fixed_scaling factor is 3.5 using Equation 7 above. Therefore, the relationship between P(c=0), LLR_float, and LLR_fixed is shown in Table 1 below.

TABLE 1

| P(c = 0) | LLR_float | LLR_fixed |
|---|---|---|
| 0.0010% | 11.51 | 40.00 |
| 10.0000% | 2.20 | 8.00 |
| 20.0000% | 1.39 | 5.00 |
| 30.0000% | 0.85 | 3.00 |
| 40.0000% | 0.41 | 1.00 |
| 50.0000% | 0.00 | 0.00 |
| 60.0000% | −0.41 | 1.00 |
| 70.0000% | −0.85 | −3.00 |
| 80.0000% | −1.39 | −5.00 |
| 90.0000% | −2.20 | −8.00 |
| 99.9990% | −11.51 | −40.00 |

In Table 1, a sign indicates whether a bit indicated by the corresponding LLR is 0 or 1. The absolute value of the LLR means reliability by definition and a larger absolute value means higher reliability. For example, LLR=0 means that the probability that the corresponding bit is 0 and the probability that is 1 are 1/2 equal, and LLR=128 means that the probability that the corresponding bit is 0 is almost 100%.

In a fixed-point implementation, generating the same extrinsic LLR as a floating-point implementation requires an increase in the number of bits in the input LLR and the APP LLR of the core. This means that the bit widths of the LLRs processed in the core must increase. The size of the core is required to increase in proportion to the bit width. The method proposed in the disclosure enables the performance of iterative decoding like EXT LLR to be improved without increasing the size of the core.

Figure 5:
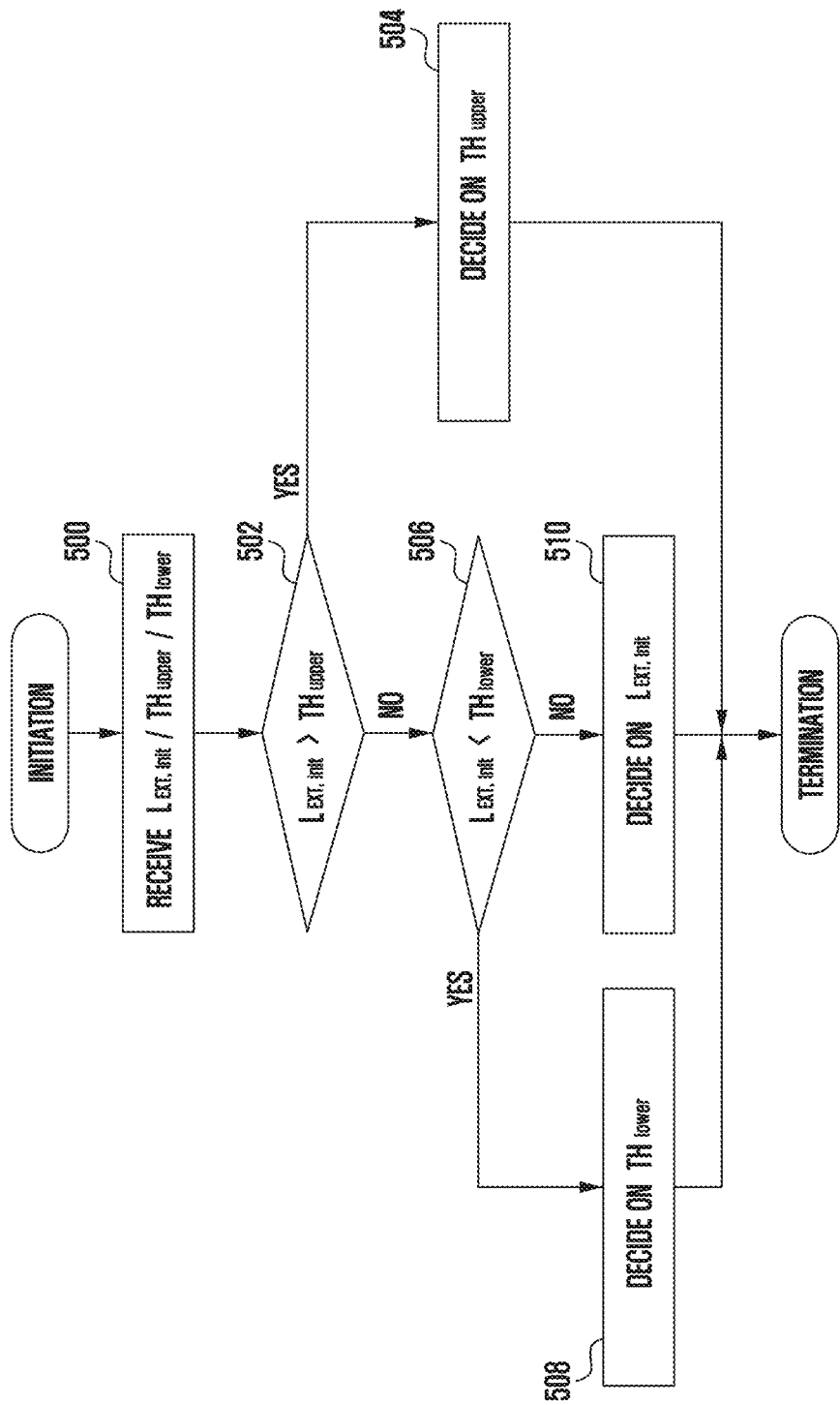
FIG. 5 is a control flowchart for an operation of determining an output LLR value of an extrinsic LLR generator according to an embodiment of the disclosure.

FIG. 5 is a control flowchart for an operation of determining an output LLR value of an extrinsic LLR generator according to an embodiment of the disclosure.

Prior to description with reference to FIG. 5, an operation of the disclosure will be described using the configuration of FIG. 3B. It should be noted that this is only using one drawing for convenience of description, and the same operation may be performed if the configuration of FIGS. 3C and/or 3D is used.

Referring to FIG. 5, in operation 500, the extrinsic LLR generator 333 may receive $L_{EXT,init}$, which is an output LLR value of the initial extrinsic LLR calculator 331, and an upper threshold $TH_{upper}$ and/or a lower threshold $TH_{lower}$ received from the extrinsic LLR range calculator 332.

In operation 502, the extrinsic LLR generator 333 may check (or identify) whether $L_{EXT,init}$, which is an output LLR value of the initial extrinsic LLR calculator 331, is greater than the upper threshold $TH_{upper}$. As a result of the check in operation 502, if $L_{EXT,init}$, which is the output LLR value of the initial extrinsic LLR calculator 331, is greater than the upper threshold $TH_{upper}$, the extrinsic LLR generator 333 may perform operation 504. On the other hand, as the result of the check in operation 502, if $L_{EXT,init}$, which is the output LLR value of the initial extrinsic LLR calculator 331, is equal to or less than the upper threshold $TH_{upper}$, the extrinsic LLR generator 333 may perform operation 506.

In operation 504, the extrinsic LLR generator 333 may determine and output the EXT LLR value, which is the output of the channel decoder 320A, as the upper threshold $TH_{upper}$, since the $L_{EXT,init}$, which is the output LLR value of the initial extrinsic LLR calculator 331, is greater than the upper threshold $TH_{upper}$.

In operation 506, the extrinsic LLR generator 333 may compare $L_{EXT,init}$, which is the output LLR value of the initial extrinsic LLR calculator 331, with the lower threshold $TH_{lower}$, since the $L_{EXT,init}$, which is the output LLR value of the initial extrinsic LLR calculator 331, is equal to the upper threshold $TH_{upper}$ or less than the upper threshold $TH_{upper}$. That is, in operation 506, the extrinsic LLR generator 333 may examine (or identify) whether $L_{EXT,init}$, which is the output LLR value of the initial extrinsic LLR calculator 331, is less than the lower threshold $TH_{lower}$.

As a result of the check in operation 506, if $L_{EXT,init}$, which is the output LLR value of the initial extrinsic LLR calculator 331, is less than the lower threshold $TH_{lower}$, the extrinsic LLR generator 333 may perform operation 508. On the other hand, as a result of the check in operation 506, if $L_{EXT,init}$, which is the output LLR value of the initial extrinsic LLR calculator 331, is equal to or greater than the lower threshold $TH_{lower}$, the extrinsic LLR generator 333 may perform operation 510.

In operation 508, the extrinsic LLR generator 333 may determine and output the EXT LLR value, which is the output of the channel decoder 320A, as the lower threshold $TH_{lower}$, since the $L_{EXT,init}$, which is the output LLR value of the initial extrinsic LLR calculator 331, is less than the lower threshold $TH_{lower}$.

In operation 510, the extrinsic LLR generator 333 may determine the output value of the extrinsic LLR generator 333 as $L_{EXT,init}$, which is the output LLR value of the initial extrinsic LLR calculator 331, since the $L_{EXT,init}$, which is the output LLR value of the initial extrinsic LLR calculator 331, is equal to the lower threshold $TH_{lower}$ or greater than the lower threshold $TH_{lower}$. The above determination is possible since the operation 502 has been performed previously. That is, this is because $L_{EXT,init}$, which is the output LLR values of the initial extrinsic LLR calculator 331, exist between the lower threshold $TH_{lower}$ and the upper threshold $TH_{upper}$.

Referring to FIG. 5, the condition according to the upper threshold is checked first, but a method of first checking the condition according to the lower threshold may also be understood as an embodiment of the disclosure. In addition, in FIG. 5, the output LLR value of the initial extrinsic LLR calculator 331 is in a form compared once with the upper threshold and the lower threshold, respectively, but a method of checking at once whether the output LLR value of the initial extrinsic LLR calculator 331 is within the range within the upper threshold and the lower threshold may be implemented.

Figure 6:
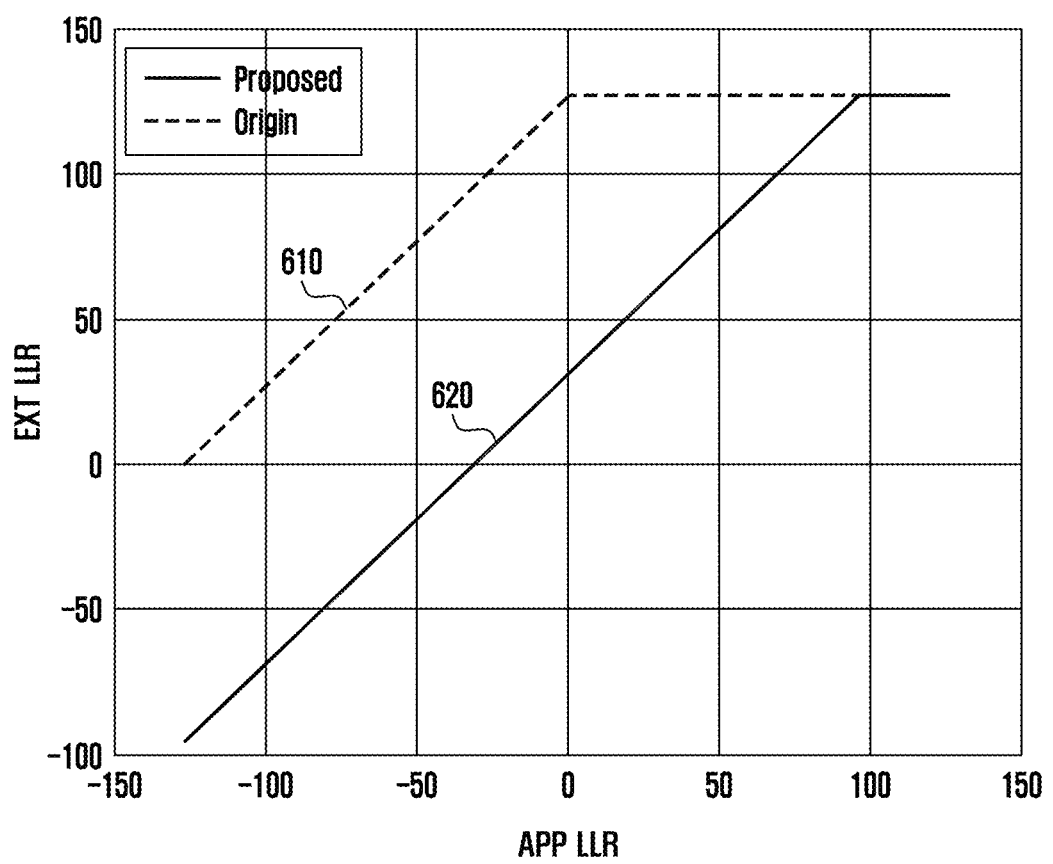
FIG. 6 is a comparison graph of simulations when a channel decoder is implemented with 8 bits in a wireless communication system using MIMO and a channel code by connecting according to an embodiment of the disclosure.

FIG. 6 is a comparison graph of simulations when a channel decoder is implemented with 8 bits in a wireless communication system using MIMO and a channel code by connecting according to an embodiment of the disclosure.

Referring to FIG. 6, if a priori LLR is −127 and TH is set to 31, a simulation graph 610 according to the prior art and a simulation graph 620 according to the disclosure are illustrated.

If a priori LLR has a value of −127 due to the good receiving environment, there is a high probability that the extrinsic LLR is also calculated as −127 as shown in FIG. 6.

If the extrinsic LLR is −127, the APP LLR must be calculated as −254, but due to the fixed-point implementation, the APP LLR is saturated with −127 and calculated.

Referring to the distribution of FIG. 4 described above, the EXT LLR is calculated in the vicinity of the APP LLR. However, if an effect according to the fixed-point implementation occurs, an EXT LLR that is not normal (out of the statistical range) may be generated as shown in reference numeral 610 of FIG. 6. If the method proposed in the disclosure is used, an EXT LLR such as reference numeral 610 may be made into the EXT LLR in the vicinity (so as to be within a statistical range) of the APP LLR such as reference numeral 620. For example, in a case of APP LLR=0, the graph of the origin of reference numeral 610 generates an EXT LLR of about 130. However, since APP LLR=0 means that the corresponding bit is not known whether it is 0 or 1, the EXT LLR must also be generated as a value close to 0. However, the origin of reference numeral 610 has erroneous information that the probability that the corresponding bit is 0 is almost 100% since the EXT LLR is generated with a value close to 130 due to the effect of the fixed-point. On the other hand, in a case of using the method according to the disclosure, if the APP LLR is 0, the EXT LLR has a value of about 40, since the calibration is performed as shown in reference numeral 620. In addition, as the iterative decoding is performed by applying the method according to the disclosure, it is possible to gradually obtain an accurate value.

As a result, the extrinsic LLR according to the prior art is output as APP LLR−PRI LLR=−127−(−127)=0 due to the saturated APP LLR value. However, since the method proposed in the disclosure limits the size of the extrinsic LLR according to the size of the APP LLR, it may be seen that the actual extrinsic LLR value of −127 is output.

In addition, the improvement of IDD performance of a coded MIMO system according to the method proposed in the disclosure may be confirmed with reference to Table 2 below.

TABLE 2

| APP | EXT, TH | | | | | | |
|---|---|---|---|---|---|---|---|
|  | 0 | 1 | 2 | 4 | 8 | 16 | 127 |
| 174% | 174% | 175% | 173% | 182% | 181% | 172% | 169% |

Table 2 is a table for describing IDD performance of a coded MIMO system according to the method proposed in the disclosure. It is assumed that a MIMO system in which the number of reception antennas used in Table 2 is 4. It is assumed that the number of IDD iterations is 4, QPSK, LDPC coding having 10 iterations, 208 information bit, and code rate=1/3.

The value in Table 2 represents a TPUT gain compared to a receiver without IDD in a given SNR. Since the LDPC coding using an 8-bit LLR is used, if TH is 127, it indicates performance according to the existing extrinsic LLR generation method. As shown in Table 2, in case that using the extrinsic LLR generation method according to the proposed method compared to the existing extrinsic LLR generation method, a performance gain of about 8% may be obtained by using an appropriate TH. Therefore, if the method and device according to the disclosure are applied, there is an advantage in that decoding performance may be improved.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device in a wireless communication system, the electronic device comprising:
    a multiple-input multiple-output (MIMO) detector configured to generate an output log likelihood ratio (LLR) value based on signals received from a plurality of antennas and a feedback LLR value;
    a channel decoder configured to output a channel decoded LLR value through channel decoding and a second operation by using the LLR value of the MIMO detector; and
    a feedback compensator configured to generate the feedback LLR value so that the channel decoded LLR value is between an upper threshold and a lower threshold determined based on a bit width of an LLR of the electronic device.

2. The electronic device of claim 1, wherein the MIMO detector comprises:
    a MIMO detector core configured to generate a first LLR value based on the signals received from the plurality of antennas and the feedback LLR value; and
    a first adder configured to generate the output LLR value by calculating a difference between the first LLR value and the feedback LLR value.

3. The electronic device of claim 2, wherein the channel decoder comprises:
    a channel decoder core configured to perform channel decoding based on the output LLR value and to output a second LLR value; and
    a second adder configured to generate the decoded LLR value by performing the second operation on the second LLR value.

4. The electronic device of claim 3, wherein the feedback compensator comprises:
    an extrinsic LLR range calculator configured to determine the upper threshold and the lower threshold based on a threshold determined based on the bit width of the LLR used by the electronic device; and
    an extrinsic LLR generator for generating the feedback LLR value so that the decoded LLR value is between the upper threshold and the lower threshold received from the extrinsic LLR range calculator.

5. The electronic device of claim 2, wherein the channel decoder comprises a channel decoder core configured to perform channel decoding based on the output LLR value and to output a second LLR value.

6. The electronic device of claim 5, wherein the feedback compensator comprises:
    an initial extrinsic LLR calculator configured to generate the decoded LLR value by performing the second operation on the second LLR value;
    an extrinsic LLR range calculator configured to determine the upper threshold and the lower threshold by using a threshold determined based on the bit width of the LLR of the electronic device; and
    an extrinsic LLR generator configured to generate the feedback LLR value so that the decoded LLR value is between the upper threshold and the lower threshold received from the extrinsic LLR range calculator.

7. The electronic device of claim 6, wherein the second operation comprises calculating a difference between the second LLR value and the output LLR value.

8. The electronic device of claim 6,
wherein the extrinsic LLR generator configured to generate the feedback LLR value by setting the decoded LLR value as the upper threshold based on the decoded LLR value being greater than the upper threshold, and
wherein the extrinsic LLR generator is configured to generate the feedback LLR value by setting the decoded LLR value as the lower threshold based the decoded LLR value being less than the lower threshold.

9. The electronic device of claim 5, wherein the upper threshold is calculated based on an equation $TH_{upper}=\min(L_{APP}+TH, M)$,
where $TH_{upper}$ is the upper threshold, LAPP is an LLR value output from the channel decoder core, TH is a preset value, and M is a maximum LLR value determined by a bit width for quantizing the LLR in implementing a fixed-point method.

10. The electronic device of claim 5, wherein the lower threshold is calculated based on an equation $TH_{lower}=\max(L_{APP}-TH,-M)$,
where $TH_{lower}$ is the lower threshold, LAPP is an LLR value output from the channel decoder core, TH is a preset value, and –M is a minimum LLR value determined by a bit width for quantizing the LLR in implementing a fixed-point method.

11. The electronic device of claim 1, wherein the channel decoder is further configured to output a decoded signal in response to decoding being performed for a predefined number of repetitions between the MIMO detector and the channel decoder or decoding success occurring.

12. An electronic device in a wireless communication system, the electronic device comprising:
a multiple-input multiple-output (MIMO) detector that generates an output log likelihood ratio (LLR) value by using signals received from a plurality of antennas and a feedback LLR value; and
a channel decoder,
wherein the channel decoder comprises:
a channel decoder core configured to perform channel decoding based on the output LLR value and to output a second LLR value,
an initial extrinsic LLR calculator configured to generate a decoded LLR value by performing a second operation on the second LLR value,
an extrinsic LLR range calculator configured to determine an upper threshold and a lower threshold based on a threshold determined based on a bit width of the LLR of the electronic device, and
an extrinsic LLR generator configured to generate the feedback LLR value so that the decoded LLR value is between the upper threshold and the lower threshold received from the extrinsic LLR range calculator.

13. The electronic device of claim 12, wherein the MIMO detector comprises:
a MIMO detector core configured to generate a first LLR value based on the signals received from the plurality of antennas and the feedback LLR value; and
a first adder configured to generate the output LLR value by calculating a difference between the first LLR value and the feedback LLR value.

14. The electronic device of claim 12, wherein the second operation comprises calculating a difference between the second LLR value and the output LLR value.

15. The electronic device of claim 12,
wherein the extrinsic LLR generator is configured to generate the feedback LLR value by setting the decoded LLR value as the upper threshold in case that the decoded LLR value is greater than the upper threshold, and
wherein the extrinsic LLR generator is configured to generate the feedback LLR value by setting the decoded LLR value as the lower threshold in case that the decoded LLR value is less than the lower threshold.

16. A method performed by an electronic device in a wireless communication system, the method comprising:
generating an output log likelihood ratio (LLR) value based on signals received from a plurality of antennas and a feedback LLR value;
outputting a second LLR value by performing channel decoding based on the output LLR value;
generating a decoded LLR value by performing a second operation on the second LLR value;
determining an upper threshold and a lower threshold based on a threshold determined based on a bit width of the LLR of the electronic device; and
generating the feedback LLR value so that the decoded LLR value is between the upper threshold and the lower threshold.

17. The method of claim 16,
wherein the feedback LLR value is generated based on the decoded LLR value set as the upper threshold in case that the decoded LLR value is greater than the upper threshold, and
wherein the feedback LLR value is generated based on the decoded LLR value set as the lower threshold in case that the decoded LLR value is less than the lower threshold.

* * * * *